Patented Feb. 2, 1943

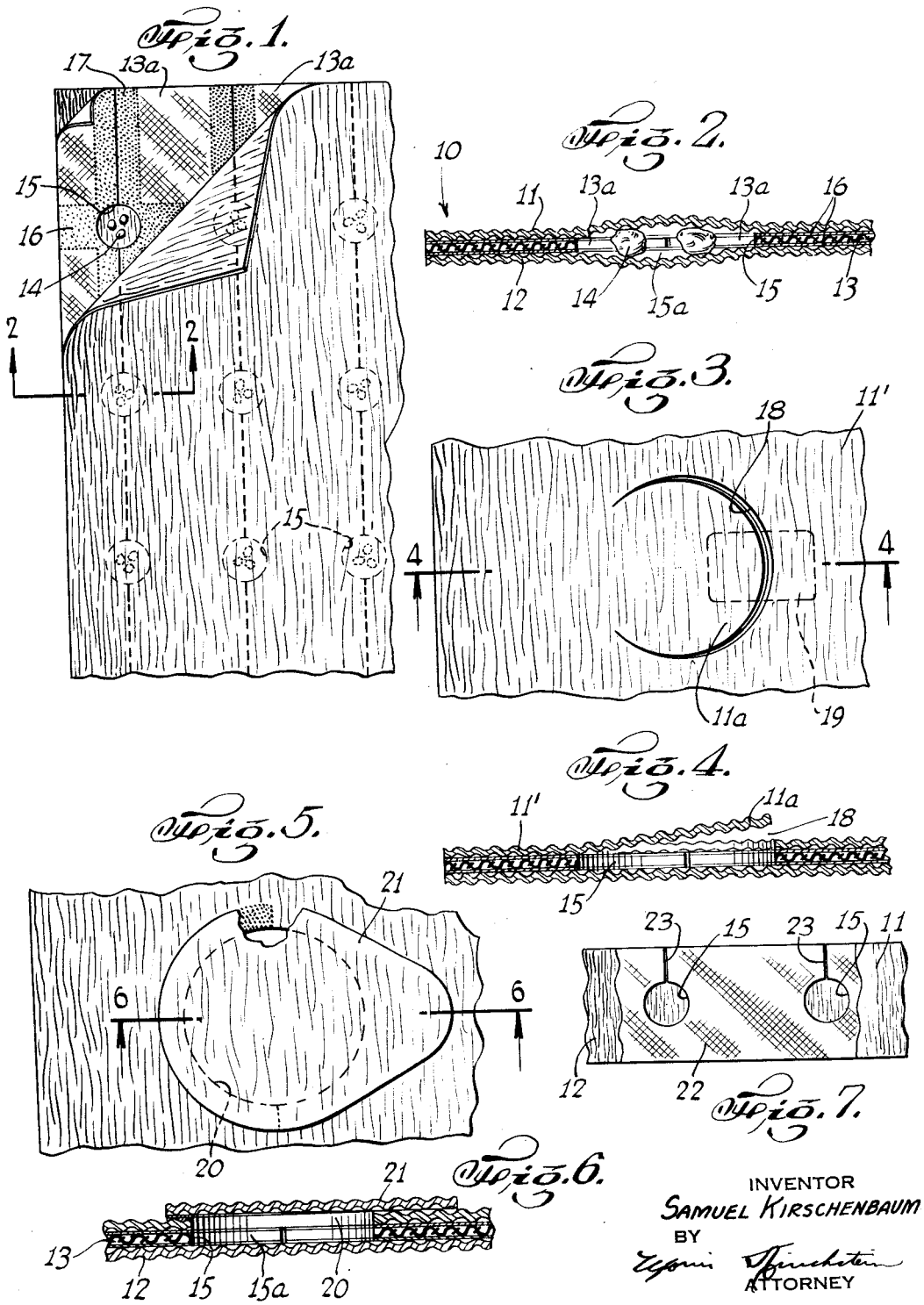

2,309,702

UNITED STATES PATENT OFFICE 2,309,702

SEED PLANTING PACKAGE

Samuel Kirschenbaum, Brooklyn, N. Y.

Application April 13, 1939, Serial No. 267,628

9 Claims. (Cl. 47—56)

This invention relates to seed planting. More particularly, my invention relates to an improved construction for a seed planting package or tape.

One of the objects of my invention is to provide a seed planting package or tape of the character described in which the seeds contained therein will be prevented from being washed away by heavy rains and which at the same time is so designed as to retard the growth of weeds between the seeds.

Another object of my invention is to provide a seed planting package or tape of the character described which shall comprise relatively few and simple parts, which shall be relatively inexpensive to manufacture, easy to assemble and which at the same time shall be a general improvement in the art.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a plan view of a seed planting package constructed in accordance with my invention and having portions of the top and intermediate layers turned back to reveal the interior construction thereof;

Fig. 2 is an enlarged cross-sectional view taken substantially on the line 2—2 of Fig. 1;

Fig. 3 is a plan view of a portion of a seed planting package similar to Fig. 1 but illustrating a modified form of my invention;

Fig. 4 is a cross-sectional view taken substantially on the line 4—4 of Fig. 3;

Fig. 5 is a plan view similar to Fig. 3 but illustrating still another modified form of my invention;

Fig. 6 is a cross-sectional view taken substantially on the line 6—6 of Fig. 5; and Fig. 7 is a plan view of my invention as applied to a seed tape.

In the type of seed planting tapes and packages heretofore employed, it has been found that when a heavy rain occurs soon after the seed package has been properly positioned in the ground for planting, the seeds contained in the package were washed away with the rain and thus the desired planting arrangement or layout was destroyed. In accordance with my invention, I have provided a seed planting package so constructed as to obviate the above described disadvantage and which at the same time will retard the growth of weeds between the rows of seeds until such time as the plants have started to grow.

Referring now in detail to the drawing, there is shown in Figs. 1 and 2 a seed planting package constructed in accordance with my invention and comprising a laminated sheet structure 10 consisting of a top layer 11, bottom layer 12 and an intermediate layer 13. The outer layers 11 and 12 are preferably made of a porous material which will disintegrate after being in the ground for a predetermined period of time. The intermediate layer 13 is preferably made of porous fabric or any other similar suitable material which will not disintegrate due to moisture. The layer 13 may be provided with a plurality of through apertures 15 arranged in any desired spaced formation and adapted to serve as pockets in which the seeds 14 are placed. In constructing the seed package of my invention, the bottom layer 12 may first be positioned on a flat surface after which the fabric layer 13 is superimposed therein. The seeds 14 are then placed in the seed pockets 15a formed by the apertures 15, after which the top layer 11 is superimposed on the fabric layer 13 to hold the seeds captive in the seed pockets. The layers 11, 12 and 13 may be maintained in superimposed relationship by any suitable connecting means such as, for example, horizontal and vertical rows 16 and 17 of adhesive material interposed between the fabric layer 13 and each of the layers 11 and 12.

It is thus seen from the above described construction that when the ground has been properly prepared and the seed planting package 10 placed therein, and covered over with a thin layer of earth, if desired, heavy rains occurring before the seeds have had sufficient time to take root will not wash away the seeds since they are held captive within the seed pockets 15a. As explained above, the layers 11 and 12 are made of material which will disintegrate after the seeds have taken root. The layer 13 being of fabric material will not disintegrate and will therefore act so as to retard the growth of weeds between the rows of seeds while permitting the seeds to grow, due to the apertures 15.

If it is desired to remove the fabric layer 13 after the seeds have grown to a predetermined height, the said layer 13, instead of being made of a single piece, may be constructed of a plurality of strips 13a having their longitudinal edges contiguously disposed. Each of the strips 13a may then be correspondingly notched at spaced intervals along their longitudinal edges to form the seed pockets 15. By this construction it is seen that when it is desired to remove the fabric layer 13, each of the strips 13a may be separately stripped off the ground without causing damage to the plant.

In the form of my invention illustrated in Figs. 1 and 2, it is noted that the arrangement and layout of the seeds is determined before the package is completed. In Figs. 3 and 4, however, I have shown a modified form of my invention in which the seed package is of laminated construction similar to that shown in Figs. 1 and 2 but in which the top layer 11' is provided with slits 18 disposed in register with and for the purpose of obtaining access to the seed pockets 15a. The said seed pockets 15a and the corresponding slits 18 in one of the outer layers 11 or 12 may be indiscriminately scattered over the entire area of the package and disposed relatively closely adjacent to each other so that the user may design his own arrangement or layout of seeds by selectively filling any number of desired pockets 15a.

In order to prevent the curling up or opening of the portions 11a adjacent the slits 18, a gummed sticker 19 shown in dotted lines in Fig. 3 may be employed to prevent such condition.

In Figs. 5 and 6 I have shown a form of my invention similar to that shown in Figs. 3 and 4, but in which, instead of the slit 18 which is arranged in register with the seed pockets 15a, I provide a full aperture 20 in the top layer 11 corresponding to and in alignment with the seed pocket apertures 15 in the fabric layer 13. In this form of my invention I provide an adhesively attached cover member 21 which may be partially removed in order to insert the seeds in the pockets 15a after which the member 21 may be resealed as shown in Fig. 5.

In Fig. 7 I have shown my invention as applied to a seed tape and designed so that a single longitudinal row of seeds may be planted. The structure of this form of my invention is similar to that shown in Figs. 1 to 6 except that the intermediate fabric layer 22 is provided with a slit 23 communicating with the pocket apertures 15 and extending therefrom transversely of the tape to one longitudinal edge thereof so that if it is desired to remove the fabric layer 22 from the ground after the seeds have grown, the same may be done without damage or injury to the plants.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A seed tape for the character described comprising a top layer, a bottom layer and an intermediate layer, a row of apertures in said intermediate layer spaced along the length of said tape, seeds in said apertures confined between said top and bottom layers, and slits in said intermediate layer communicating with said apertures and extending transversely therefrom toward a longitudinal edge of said tape for the purposes set forth.

2. A seed package or tape of the character described comprising a top layer, a bottom layer and an intermediate layer, said intermediate layer being provided with a plurality of through apertures, and a slit in said top layer communicating with said intermediate layer apertures through which to selectively insert seeds within the space defined by said apertures.

3. A seed package or tape of the character described comprising a top layer, a bottom layer and an intermediate layer, said intermediate layer being provided with a plurality of through apertures, an opening in said top layer communicating with said intermediate layer apertures through which to selectively insert seeds within the space defined by said apertures, and a removable cover member overlying said top layer opening and attached to said top layer.

4. A seed package or tape of the character described adapted to be planted underneath the surface of the earth, said package comprising at least three superimposed co-extensive layers including an intermediate layer of a material which will not readily disintegrate, said layer having a plurality of apertures therethrough, and top and bottom layers of readily disintegratable material overlying and underlying said intermediate layer and cooperating with said apertures to form closed seed-containing packets from which said intermediate layer extends horizontally when said package or tape is planted, said intermediate layer serving to maintain the seeds in position during germination and to prevent the growth of weeds between said apertures, the apertures in said intermediate layer communicating with an edge of said layer so that said layer may be stripped away from plants grown from the seeds, without causing damage thereto.

5. A seed package or tape of the character described adapted to be planted underneath the surface of the earth, said package comprising at least three superimposed co-extensive layers including an intermediate layer of a material which will not readily disintegrate, said layer having a plurality of apertures therethrough, and top and bottom layers of readily disintegratable material overlying and underlying said intermediate layer and cooperating with said apertures to form closed pockets from which said intermediate layer extends horizontally when said package or tape is planted, and seeds in said pockets, said intermediate layer serving to maintain said seeds in position during germination and to prevent the growth of weeds between said apertures, the apertures in said intermediate layer communicating with an edge of said layer so that said layer may be stripped away from plants grown from said seeds without causing damage thereto.

6. A seed package or tape of the character described adapted to be planted underneath the surface of the earth, said package comprising at least three superimposed co-extensive layers including an intermediate layer of a material which will not readily disintegrate due to moisture, said layer having a plurality of apertures therethrough, and top and bottom layers of readily disintegratable material overlying and underlying said intermediate layer and cooperating with said apertures to form closed pockets from which said intermediate layer extends horizontally when said package or tape is planted, and seeds in said pockets, said top and bottom layers being made of porous material which will disintegrate when subjected to moisture, said intermediate layer serving to maintain said seeds in position during germination and to prevent the growth of weeds between said apertures, the apertures in said intermediate layer communicating with an edge of said layer so that said layer may be stripped away from plants grown from the seeds without causing damage thereto.

7. A seed package or tape of the character described adapted to be planted underneath the surface of the earth, said package comprising at least three superimposed co-extensive layers including an intermediate layer of a material which will not readily disintegrate and top and bottom layers of readily disintegratable material, said intermediate layer comprising a plurality of longitudinal strips arranged with their longitudinal edges contiguously disposed and with seeds between said edges and intermediate said top and bottom layers so that said intermediate layer may be stripped away from plants grown from said seeds without causing damage thereto, said intermediate layer serving to maintain the seeds in position during germination and to prevent the growth of weeds.

8. A seed package or tape of the character described adapted to be planted underneath the surface of the earth, said package comprising at least three superimposed co-extensive layers including an intermediate layer of a material which will not readily disintegrate and top and bottom layers, said intermediate layer comprising a plurality of longitudinal strips arranged with their longitudinal edges contiguously disposed, the said longitudinally disposed edges of said strips being notched at spaced points, the notches in one of said strips being in opposed registered relationship to the notches in the contiguously disposed strip to form pockets between the strips, said top and bottom layers serving to close said pockets, seeds in said pockets, said top and bottom layers being composed of a material which will readily disintegrate whereby said intermediate layer may be stripped away from plants grown from said seeds without causing damage thereto, said intermediate layer serving to maintain the seeds in position during germination and to prevent the growth of weeds between said pockets.

9. A seed package or tape of the character described adapted to be planted underneath the surface of the earth, said package comprising at least three superimposed co-extensive layers including an intermediate layer of fabric material which will not readily disintegrate due to moisture, said layer having a plurality of predeterminedly arranged apertures therethrough, and top and bottom layers overlying and underlying said intermediate layer and cooperating with said apertures to form closed seed-containing pockets from which said intermediate layer extends horizontally when said package or tape is planted, said top and bottom layers being made of a porous material which will disintegrate when subjected to moisture, said intermediate layer serving to maintain the seeds in position during germination and to prevent the growth of weeds between said pockets, the apertures in said intermediate layer communicating with an edge of said layer so that said layer may be stripped away from plants grown from the seeds without causing damage thereto.

SAMUEL KIRSCHENBAUM.